US009180983B2

(12) United States Patent
Sperandei

(10) Patent No.: US 9,180,983 B2
(45) Date of Patent: Nov. 10, 2015

(54) ACTUATOR WITH TRANSFER OF ANGULAR MOMENTUM FOR THE ATTITUDE CONTROL OF A SPACECRAFT

(75) Inventor: Jean Sperandei, Toulouse (FR)

(73) Assignee: Airbus Defence And Space SAS, Paris (FR)

( * ) Notice: Subject to any disclaimer, the term of this patent is extended or adjusted under 35 U.S.C. 154(b) by 787 days.

(21) Appl. No.: 12/744,174

(22) PCT Filed: Nov. 18, 2008

(86) PCT No.: PCT/EP2008/065732
§ 371 (c)(1),
(2), (4) Date: Aug. 16, 2010

(87) PCT Pub. No.: WO2009/065818
PCT Pub. Date: May 28, 2009

(65) Prior Publication Data
US 2010/0314499 A1     Dec. 16, 2010

(30) Foreign Application Priority Data
Nov. 22, 2007  (GB) ..................................... 07 59224

(51) Int. Cl.
*B64G 1/28*     (2006.01)

(52) U.S. Cl.
CPC .................. *B64G 1/283* (2013.01); *B64G 1/28* (2013.01); *B64G 1/286* (2013.01); *B64G 1/285* (2013.01)

(58) Field of Classification Search
CPC .......... B64G 1/28; B64G 1/283; B64G 1/285; B64G 1/286
USPC ..................................................... 476/39, 40
See application file for complete search history.

(56) References Cited

U.S. PATENT DOCUMENTS

| | | | | |
|---|---|---|---|---|
| 2,786,363 A | * | 3/1957 | Davies et al. .................... | 476/40 |
| 3,270,985 A | * | 9/1966 | Schmidt ........................ | 244/165 |
| 4,078,748 A | * | 3/1978 | Sen .............................. | 244/170 |
| 4,382,188 A | | 5/1983 | Cronin | |

(Continued)

FOREIGN PATENT DOCUMENTS

| | | | |
|---|---|---|---|
| DE | 19640277 | 3/1997 | |
| EP | 1095852 | 5/2001 | |
| JP | 2274698 | * 8/1990 | .................... 244/165 |

OTHER PUBLICATIONS

International Search Report Dated Dec. 23, 2008.

*Primary Examiner* — Tien Dinh
*Assistant Examiner* — Michael A Fabula
(74) *Attorney, Agent, or Firm* — RatnerPrestia

(57) ABSTRACT

An attitude control actuator of a spacecraft includes a first momentum wheel driven in rotation by a motor and a second momentum wheel. Both momentum wheels are movable in rotation about an axis and are mechanically coupled by coupling means imposing between a rotation speed ω1 of the first momentum wheel and a rotation speed ω2 of the second momentum wheel a ratio R=ω2/ω1, negative on the one hand and continuously modifiable by the coupling means in response to a command on the other hand so as to modify the total angular momentum of the actuator while the total kinetic energy of the wheels are kept constant. In one embodiment, both momentum wheels have the same inertia and are coupled through a toroidal variable rotation speed drive, where ratio R varies between −3 and −⅓. The motor drives the momentum wheels and operates as a generator for braking the momentum wheels.

25 Claims, 2 Drawing Sheets

(56) References Cited

U.S. PATENT DOCUMENTS

| | | | |
|---|---|---|---|
| 4,723,735 A | | 2/1988 | Eisenhaure |
| 5,263,907 A | * | 11/1993 | Fellows ........................... 476/40 |
| 5,423,727 A | * | 6/1995 | Fellows ........................... 476/40 |
| 5,655,989 A | * | 8/1997 | Yamamoto ..................... 476/40 |
| 6,311,931 B1 | * | 11/2001 | Smay ............................ 244/164 |
| 6,340,137 B1 | * | 1/2002 | Davis et al. ................... 244/165 |
| 2002/0121572 A1 | * | 9/2002 | Jacobson ...................... 244/165 |
| 2006/0032985 A1 | * | 2/2006 | Smith et al. ................... 244/165 |

\* cited by examiner

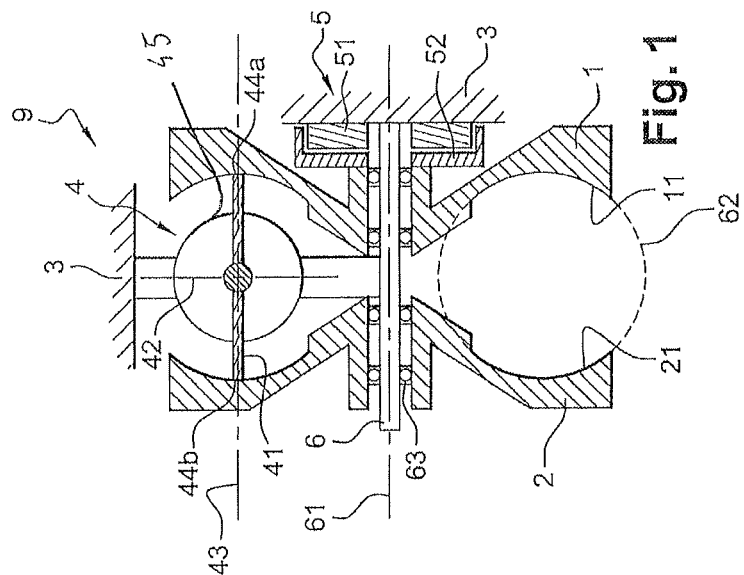
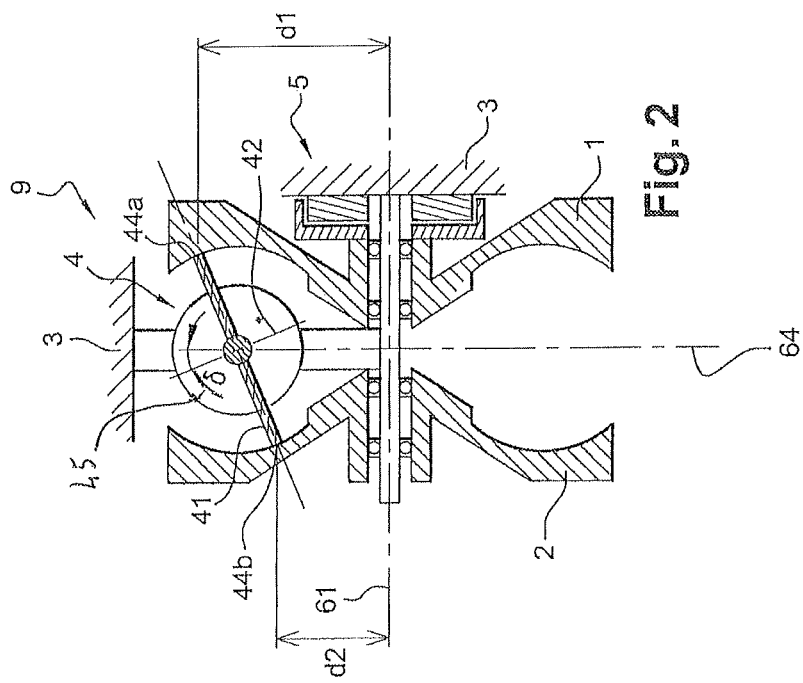

— 1 —

ACTUATOR WITH TRANSFER OF ANGULAR MOMENTUM FOR THE ATTITUDE CONTROL OF A SPACECRAFT

RELATED APPLICATIONS

This is a national phase application of PCT International Application No. PCT/EP2008/065732, filed Nov. 18, 2008, which claims priority to French Application No. 0759224, filed Nov. 22, 2007, the contents of said applications being incorporated by reference herein for all purposes.

FIELD OF THE INVENTION

The present invention belongs to the fields of the attitude control of spacecrafts, and more particularly satellites, which must be pointed in variable directions when in operation.

More particularly, the invention relates to attitude control actuators using kinetic energy accumulating means.

Secondly or mainly, the kinetic energy of the actuator can be used as a source of stored energy.

BACKGROUND

Depending on its missions, a spacecraft, more particularly a satellite such as an observation satellite, must be able to be oriented and stabilized in accurate particular directions.

This general problem is particularly critical for observation satellites for which the optical line of sight of an observation instrument must be able to quickly tilt depending on the directions of the centers of interest.

Today, for this type of attitude and stabilization control, two main families of actuators are used.

A first family corresponds to reaction wheels.

A reaction wheel generally includes a disc commanded and controlled in rotation about a fixed axis in a reference system linked to the spacecraft aboard which it is installed.

When the disc, coupled to the driving motor, is accelerated or slowed, the variation of the angular momentum of the disc is transmitted to the spacecraft which then rotates about the axis corresponding to the variation of the angular momentum of the disc.

By coupling three or more reaction wheels, the axes of rotation of which have different directions in the reference system of the spacecraft, it is possible to orientate the spacecraft in every direction.

Such a known device is renowned for its robustness, more particularly because of the small numbers of movable parts. In addition, it generates torques along a fixed direction with respect to the spacecraft, which simplifies the attitude control laws. However, it has the drawback of consuming energy each time the disc rotation speeds must be accelerated to create angular momentum, and the energy is generally dissipated when the disc rotation speed is decreased to destroy angular momentum. Furthermore, the obtainable maximum torque is limited to at most a few Nm for space applications because its efficiency is in the wheel/satellite inertia ratio and because the required power increases with the wheel speed.

Another family corresponds to gyroscopic actuators.

According to the general principle, a gyroscopic actuator includes a constant speed rotation momentum wheel rotating about an axis, the orientation of which can be modified with respect to a reference system of the spacecraft.

Therefore, the momentum wheel is carried by a gimbal device controlled in position, with the wheel rotation speed being kept constant.

When the orientation of the wheel axis of rotation, i.e. the orientation of the corresponding angular momentum, is modified in a reference system of the spacecraft through an action of the gimbal device, a torque is generated which is transmitted to the spacecraft through the actuator's supports.

By coupling several gyroscopic actuators, it is possible to orient the spacecraft in every direction.

This type of actuator is advantageous since the creation of the torque is obtained through the transfer of angular momentum without loss of the wheel mechanical energy (except for frictions). For a given electric power, the gyroscopic actuator can obtain much more important torques (typically a hundred times more important) than the reaction wheel.

However, the systems using gyroscopic actuators are relatively complex because of the complexity of the actuators themselves which are provided with gimbal devices and because the gyroscopic torques generated by this type of actuator are rotating in the satellite axis, which requires complex guidance and control laws for the implementation thereof.

Such attitude control devices with gyroscopic actuators also have the drawback of having singular points for which the attitude control cannot be normally provided, which leads to oversize the system of actuators, for example using four actuators instead of three for the spacecraft attitude control along the three axes thereof.

BRIEF DESCRIPTION OF THE DRAWINGS

FIG. 1 is a section of an actuator in a first position;

FIG. 2 is a section of the actuator of FIG. 1 in a second position; and

DETAILED DESCRIPTION OF THE INVENTION

Figure 3:
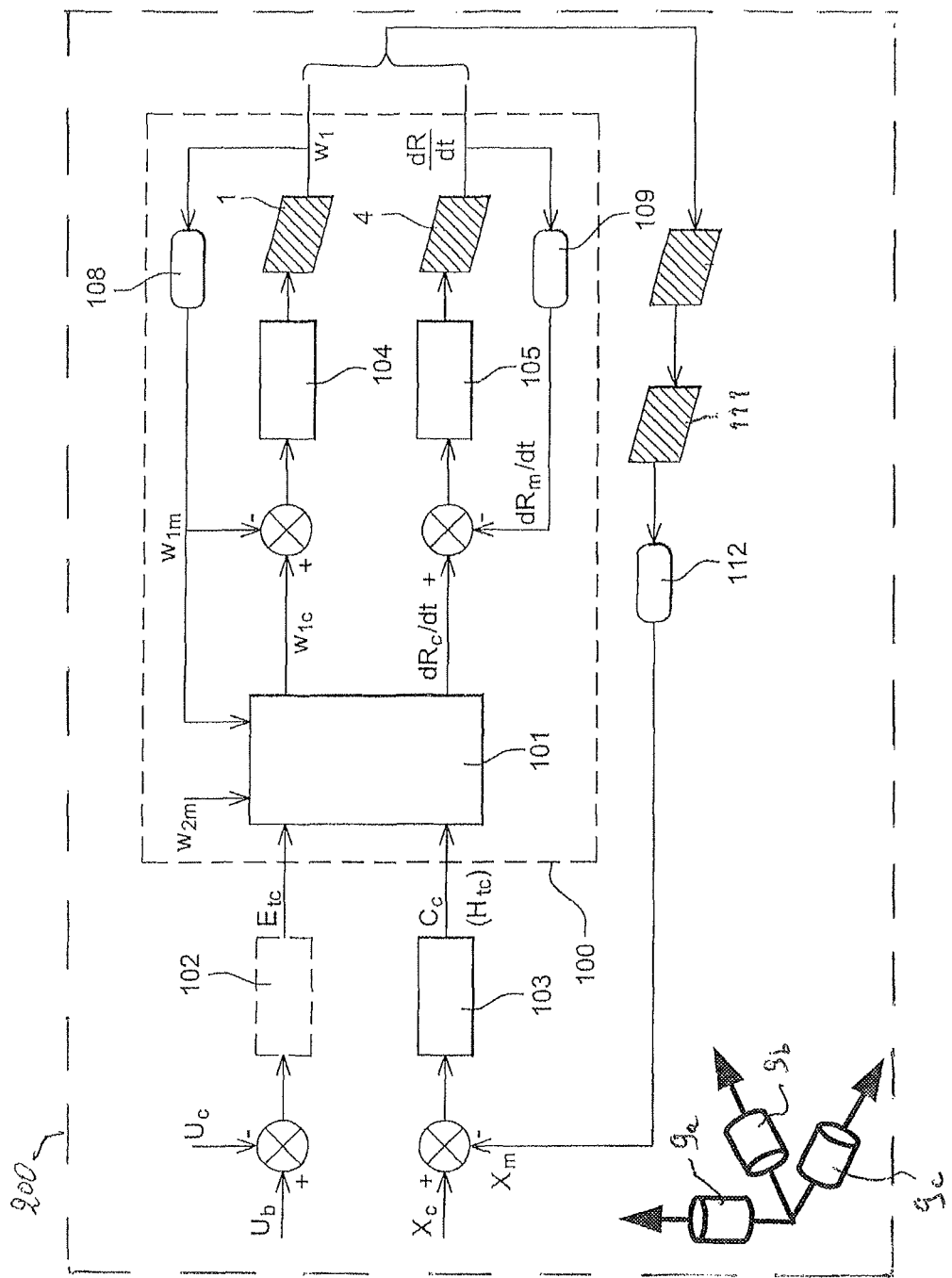
FIG. 3 is a block diagram of an exemplary control system for one actuator.

In response to such different drawbacks, the actuator of the invention combines the advantages of the actuators known in the prior art, reaction wheels actuators and gyroscopic actuators, i.e. obtaining important torques through the transfer of angular momentum at constant kinetic energy as it is the case for gyroscopic actuators but with a fixed axis with respect to the spacecraft, as it is the case with reaction wheels.

In order to be able to quickly modify the total angular momentum Ht of the actuator without adding or taking energy, the attitude control actuator of a spacecraft includes a first momentum wheel driven in rotation by at least one motor about an axis of rotation, fixed with respect to a reference system linked to the spacecraft and includes a second momentum wheel:

movable in rotation about an axis parallel to or coinciding with the axis of rotation of the first momentum wheel;

mechanically coupled with the first momentum wheel through mechanical coupling means;

said mechanical coupling means imposing between a rotation speed ω1 of the first momentum wheel and a rotation speed ω2 of a second momentum wheel, a ratio R=ω2/ω1.

The ratio R is negative on the one hand and can be modified by the coupling means in response to a command on the other hand.

Advantageously, to work symmetrically about a neutral position, wherein the total angular momentum of the actuator is null, the first momentum wheel and the second momentum wheel have the same inertia.

Preferably, to have a point of operation of the actuator for which a total angular momentum Ht of the actuator is null, the ratio R can be modified substantially continuously between a first value or minimum value of less than −1 and a second value or maximum value of more than −1.

In a particular embodiment, which allows to limit the situations of saturation of the actuator without inducing excessive complexity of the actuator, the ratio R of the coupling means varies in the range of −3 and −⅓.

In one embodiment, which is particularly advantageous for the compactness thereof, the coupling means include a rotation speed toroidal variable rotation speed drive also known as a toroidal continuously variable transmission (CVT), wherein at least one roller linked to a fixed structure of the actuator, rests on rolling surfaces of the momentum wheels. To provide a contact of the roller or rollers with the rolling surfaces for the various positions of the roller or the rollers, the rolling surfaces in such a variable rotation speed drive are determined by the surface of a circular toroid having the same axis as the axis of rotation of the momentum wheels and having a circular straight section.

To modify the relative rotation speeds of both momentum wheels, advantageously a tilt angle δ of the roller, the inclination determining the ratio R of the toroidal variable rotation speed drive, is controlled by a gear motor.

In order to allow the monitoring of the operation of the actuator and the control thereof on set values, the actuator includes:
- a measuring device which supplies at least one signal characteristic of the rotation speed of at least one of the momentum wheels. Such a measuring device includes for example at least one tachometer for measuring the rotation speed of one of the momentum wheels;
- a measuring device which supplies at least one signal characteristic of the ratio R or a derivative dR/dt with respect to time of said ratio R, of the coupling means. Such a measuring device includes for example means for measuring the inclination δ of the roller when a coupling means includes a toroidal variable rotation speed drive provided with a roller for the control of the ratio R;
- a device for controlling the motor driving the momentum wheels which generates a torque command or a current command allowing to obtain a set torque between a stator and a rotor of the motor;
- a device for controlling the coupling means so as to modify the value of the ratio R, which generates a torque command of a gear motor acting on the coupling means for modifying the ratio R or an inclination δ of a roller of a toroidal variable rotation speed drive, or in a variation speed of an inclination angle δ of a roller of a toroidal variable rotation speed drive.

Considering the controlling requirements for manage the energy cumulated in the momentum wheels, the device controlling the motor preferably has a bandwidth in the range of one tenth and once the bandwidth of an attitude control system of the spacecraft.

In a preferred embodiment of the actuator, the command generated by the coupling means controlling device is calculated from a set Rc or dRc/dt and from measures allowing to obtain a measured value of Rm, respectively dRm/dt, of the ratio R, respectively dR/dt a derivative with respect to time of said ratio R.

To provide a satisfactory control of the attitude of the spacecraft, the coupling means controlling device has a bandwidth equal to at least twice the bandwidth of the attitude control system of the spacecraft, and preferably in the range of five times and twenty times a bandwidth of the attitude control system of the spacecraft.

Preferably to provide the separation of the commands of the functions of storage of energy and of torque for the attitude control of the spacecraft, the actuator includes, preferably integrated in the actuator, calculation means which determine set values intended for the motor controlling device and for the coupling means controlling device depending on the set values of a torque Cc and/or of a total angular momentum Htc and/or a total energy Etc.

In a preferred embodiment of the actuator, the total kinetic energy Et of both momentum wheels is controlled on the total energy set value Etc from the measurement of the rotation speeds ω1, ω2 of both momentum wheels and the set value Etc using a torque or current command sent to the motor.

In one embodiment of the actuator, wherein the actuator is controlled with a torque set, the torque output C of the actuator is controlled with a set value Cc from a measurement of the rotation speeds ω1, ω2 of both momentum wheels and the set value Cc, using a command Rc or dRc/dt sent to coupling means actuators acting on the ratio R.

In another embodiment of the actuator, wherein the set angular momentum of the actuator is controlled, the total angular momentum Ht of both momentum wheels is controlled with a set value Htc from a measurement of rotations speeds ω1, ω2 of both momentum wheels and the set value Htc using a control Rc sent to coupling means actuators acting on the ratio R.

In order to supply in an electric form a part of the energy stored in kinetic form in the momentum wheels, at least one of the momentum wheels of the actuator is coupled to a generator capable of supplying energy by braking the momentum wheels.

In a preferred embodiment of the invention, the motor implemented for driving in rotation the momentum wheels is operated as a generator for braking said wheels in the energy supplying mode.

The invention also relates to an attitude control system in a spacecraft including at least one actuator according to the invention to provide torques along the axis of the momentum wheels of said actuator.

Advantageously, in such an attitude control system of a spacecraft, the actuator or actuators according to the invention is/are implemented for obtaining torques along the axis of the momentum wheels of the actuators and for storing or supplying electric energy stored in a kinetic form.

In one embodiment of such an attitude control system of a spacecraft, a system for regulating and distributing power from an electric supply manages the transfer of energy between aboard energy sources and the actuator on the one hand, and between energy consumers and the actuator on the other hand.

Preferably, for controlling a spacecraft, at least three actuators according to the invention are arranged fixedly in a reference system of the spacecraft so that directions defined by the axes of rotation of the momentum wheels of each one of the actuators correspond to independent directions of the attitude control of the spacecraft.

The detailed presentation of one embodiment of the invention is made while referring to the figures which schematically show:

FIG. 1: a section of an actuator in a first position;

FIG. 2: a section of the actuator of FIG. 1 in a second position;

FIG. 3: a block diagram of an exemplary control system for one actuator.

According to the invention, as illustrated in FIG. 1, an actuator 9 with momentum wheels includes:

a first momentum wheel 1;
a second momentum wheel 2;
coupling means 4 between the momentum wheels 1 and 2.

The momentum wheels 1, 2 are rotatingly mounted on the shaft 6 of an axis 61 merged with rotation axes of each one of said momentum wheels.

In a known way, each momentum wheel 1, 2 has the general shape of a disc and is made in a material, the density and distribution on the disc of which give the disc, about the axis of rotation 61 thereof an inertia in rotation, respectively J1, J2, as well as the mechanical strength and rigidity which are required for the considered field of application.

The momentum wheels 1, 2 are also mounted on the shaft 6 to limit the frictions which are the sources of energy losses and wear, for example using ball bearings 63 adapted to the speeds and forces at stake during the rotation of said wheels.

Both momentum wheels 1, 2 of the actuator 9 are independent in rotation at the level of the shaft 6, and because of the alignment of the axes thereof angular momentums, respectively H1, H2, of both said rotating wheels, are also aligned.

The coupling means 4 between the momentum wheels 1, 2 are mechanical coupling means so arranged that the respective rotation speeds $\omega 1$, $\omega 2$ of both said momentum wheels are not independent but are at any time in a determined ratio $\omega 2/\omega 1 = R$.

The ratio R is on the one hand negative, which means that $\omega 1$ and $\omega 2$ have opposite signs, which means that both momentum wheels 1, 2 rotate about the axis 61 in opposite directions and, on the other hand, it can be modified in a continuous way, or by steps which are smaller than a searched resolution, by the coupling means 4 in response to a command.

The coupling means 4 essentially includes a mechanical variable rotation speed drive or continuously variable transmission (CVT) of a rotation speed between two rotating shafts, for example a toroidal variable rotation speed drive, a belt variable rotation speed drive or an epicycloidal train variable rotation speed drive.

In the exemplary embodiment described and illustrated in the figures, a toroidal variable rotation speed drive is used because of the compactness that can be obtained by this type of variable rotation speed drive for the actuator of the invention.

To obtain the toroidal variable rotation speed drive, each momentum wheel 1, 2 includes a concave recess 11, 21 on opposite faces of said momentum wheels, part of a same toroid volume with a circular cross section, a section materialized in FIG. 1 by a discontinuous line 62, with the toroid being itself circular and having an axis coinciding with the axis of rotation 61 of the momentum wheels 1, 2.

The concave recesses 11, 21 form rolling surfaces for at least one driving roller 41.

The driving roller 41 corresponds to a disc, in practice substantially a low thickness section with respect to the diameter of a sphere according to an equatorial plane 43 of said sphere or roller plane, including a axis of rotation 42 perpendicular to the plane 43 of the roller and maintained between the momentum wheels 1, 2 so that:
the edge of the driving roller 41 forming a rolling surface is simultaneously in contact 44a, 44b with the concave recesses 11, 21 surfaces;
the axis 42 of the driving roller 41 is perpendicular to a local tangent of a circle defined by the centers of the circles 62 corresponding to the straight sections of the toroid.

The plane 43 of the driving roller 41 further is, as illustrated in FIG. 2, capable of being inclined while having the axis 42 of said driving roller maintained in an axial plane of the momentum wheels 1, 2, so that the axis 42 of the roller forms an inclination angle $\delta$ with respect to a plane 64 normal to the axis of rotation 61 of the momentum wheels.

The coupling means 4 are maintained fixed between the momentum wheels 1, 2, for example fixed to the shaft 6 or to a frame 3 forming a structure wherein the actuator 9 is integrated.

A coupling means 4 actuator, for example a gear motor 45, allows to modify the inclination angle $\delta$.

At least one of both momentum wheels, the first wheel 1 on the drawing is further driven in rotation by a motor 5, such as an electric motor, the stator 51 of which is linked to the frame 3 of the actuator 9 and a rotor 52 is linked to the driven wheel.

Because of the coupling means 4, the rotation speed of the other wheel, the second wheel 2 on the drawings, is mechanically controlled by the speed of the first wheel.

When reading the description which has just been done of the actuator 9 according to the invention, it should be understood that both momentum wheels 1, 2 are driven in rotation in opposite directions and dependently through the coupling means 4 which connect both said momentum wheels.

When a first wheel 1 rotates at a first speed $\omega 1$, the second wheel 2 rotates at a second speed $\omega 2$, with the rotation speeds being in the ratio $\omega 2/\omega 1 = R$, which is determined in the case of the toroidal variable rotation speed drive by the angle $\delta$ of the driving roller 41.

When the angle $\delta$ is modified, distances d1 and d2 of the contact points 44a, 44b of the driving roller 41 with the axis of rotation 61 of the momentum wheels are also modified, which causes the modification, in the absence of a roller sliding with respect to the surfaces of the concave recesses 11, 21, the ratio R of the rotation speeds of the momentum wheels 1, 2 in the distances d1/d2 ratio.

The geometric characteristics of the actuator 9, more particularly of the wheels 1, 2 of the roller 41 and the possible values of the inclination $\delta$, determine the extreme values which can be reached for the distances d1 and d2 and thus for the ratio R between the rotation speeds of both momentum wheels.

Advantageously, such characteristics of the actuator are determined to meet desired operational performances, including the saturation of the actuator, for example so that the ratio R can vary between extreme values of Rmax=−3 to Rmin=−⅓.

For an angle $\delta=0$ (FIG. 1), the distances d1 and d2 are equal and the ratio R is equal to −1. In this situation, the rotation speeds of the wheel are equal in absolute value and have opposite signs: $\omega 1 = -\omega 2 = \omega 0$.

For an angle $\delta \neq 0$ the distances d1 and d2 are different and the ratio R is no longer equal to −1. In this situation, the rotation speeds of the wheels are different in absolute value and $\omega 1 \neq \omega 2$.

The angular momentum of the first wheel 1 is:

$$H1 = J1 \times \omega 1$$

the angular momentum of the second wheel 2 is:

$$H2 = J2 \times \omega 2$$

and the total angular momentum actuator 1 is thus:

$$Ht = H1 + H2 = J1 \times \omega 1 + J2 \times \omega 2$$

$$Ht = \omega 1 \times (J1 + J2 \times R)$$

As R remains negative, there is a value of R, the value −J1/J2 for which Ht=0.

More particularly in a preferred embodiment of the actuator, both momentum wheels 1, 2 have the same moment of inertia:

$$J1=J2=J0$$

and the expression of the total angular momentum of the actuator is $$Ht=J0\times(\omega1+\omega2)$$

In this case $Ht=0$ when $\omega1=-\omega2=\omega0$, which means for $\delta=0$, whatever the rotation speed of the momentum wheels.

This expression of the total angular momentum of the actuator 9 shows that, when momentum wheels 1, 2 are rotating, the total angular momentum Ht depends on the reduction ratio R and it shows that it is possible to vary said total angular momentum Ht without adding energy nor taking energy on or from the momentum wheels 1, 2.

The variation of the total angular momentum Ht is obtained by transferring kinetic energy from one wheel to another through modification of the reduction ratio R of the coupling means 4.

It should be understood that to be operated through a variation of the total angular momentum Ht, such an actuator requires the momentum wheels to be maintained in rotation.

Such a transfer is theoretically obtained with a constant total energy Et:

$$Et=E1+E2=\frac{1}{2}\times J1\times\omega1^2+\frac{1}{2}\times J2\times\omega2^2=J0\times\omega0^2$$

E1 and E2 being the wheel rotation kinetic energy respectively 1, 2.

In practice, the rotation of the momentum wheels 1, 2 and the coupling means 4 cause frictions which cannot be totally avoided and which cause a slowing down of the rotation of said momentum wheels.

The motor 5 allows to compensate such losses but requires only little power as compared to the power required for accelerating conventional reaction wheels when a significant variation of the angular momentum is searched.

The motor 5 also allows to rotate the wheels from a rest position, wherein the wheels are not rotating, for example during the spacecraft launching phase. In this case, it is possible to obtain this rotation without creating a torque, since the action on the coupling means 4 allows to keep at any time the total angular momentum to zero during this operation, for example by maintaining the angle δ to zero, if both wheels have the same inertia in rotation J0.

With regard to an attitude control system in a spacecraft, the operation and use of such an actuator are similar to those of a conventional actuator with a reaction wheel.

Angular momentum variations obtained in the case of the actuator 9 of the invention by an action on the coupling means 4 include a torque C aligned with the axis 6 of the momentum wheels 1, 2, a torque C which is absorbed by interfaces of the structure 3 of the actuator and transmitted to a structure of the spacecraft.

In a known way $C(t)=dHt(t)/dt$, an expression in which the variable t means time.

In the case of the actuator 9 according to the invention, the torque C is practically obtained without consuming energy, except for friction.

The velocity with which such an actuator generates a controlled angular momentum depends on the performances of the coupling means 4, more particularly the actuator of the coupling means inclining the roller 41 in the case of a toroidal variable rotation speed drive.

Said actuator inclining the roller 41 is selected so that the bandwidth of the device for controlling the coupling means 4 is greater than at least twice the bandwidth of the attitude control system of the spacecraft and preferably in the range of 5 times and 20 times the bandwidth of the attitude control system of the spacecraft.

The control of the inclination δ of the roller 41 is obtained for example on the position, the speed or couple.

Quick variations of the total angular momentum Ht which have large amplitudes can thus be obtained only by the action on coupling means 4, which means without any significant consumption of energy, whereas the acceleration of a conventional reaction wheel would have required, to obtain an equivalent variation of the angular momentum, on the one hand an important energy and on the other hand a powerful motor and thus a size and a weight which would be much more important than the motor 5 of the actuator 9 of the invention.

As regards its operation, the actuator 9 of the invention more particularly has sensors, not shown, which enable the control thereof and control members, not shown on the figures. More particularly, at least one wheel and preferably each wheel 1, 2 is advantageously provided with rotation speed sensors, for example tachometers (at least one) and coupling means 4 are provided with sensors for the position of movable elements, for example sensors (at least one) for the inclination of the driving roller 41.

Other forms of embodiments of the actuator according to the invention can be provided.

For example, in one alternative embodiment of the actuator 9 each momentum wheel 1, 2 is provided with an electric motor 5 driving the wheels in rotation. In this case, the combined action of the motors allows to obtain an initial rotation of the wheels which is quicker and/or provides a redundancy in case of a failure of the motor.

For example, the coupling means 4 include two or several coupling rollers distributed about the rotation axes 61 of the wheels which allows, if need be, to provide a better contact of the rollers on the rolling surface 11, 21 without introducing dissymmetrical axial stresses in the wheels.

Advantageously, such an actuator 9 is also used aboard a spacecraft as a kinetic accumulator of energy.

Whereas a conventional reaction wheel is rotated only for varying the angular momentum within the attitude control of the spacecraft, and the permanent quick rotation of such a wheel would lead to the generation of the interference gyroscopic torques during manoeuvres for changing the attitude of the spacecraft, it is possible with the actuator 9 of the invention to accelerate or to slow down rotation speeds of the momentum wheels 1, 2 up to the limits acceptable for such rotation speeds of the wheels and within the limits imposed by the coupling means 4 used without creating any variation of the angular momentum of the actuator.

Thus, it is possible and advantageous to store and to take energy by acting on the rotation speeds of the wheels 1, 2 and contrary to the case of the conventional flywheels actuators, this sampling can be carried out without varying the total angular momentum Ht of the actuator 9, and thus without creating undesirable torque liable to modify the orientation of the satellite.

In this operation mode, the momentum wheels 1, 2 are accelerated in rotation by the motor or motors 5 controlled for example in torque or in current and at least a generator coupled with one of the momentum wheels is implemented when the accumulated energy must be taken by braking on said momentum wheels.

Preferably, the momentum wheels are slowed down by the motor or the same motors 5 operating as generators when energy is taken from said wheels.

The motor-generator means used determine the dynamics of the operation of the actuator in an energy storage and supply mode.

The requirements of the spacecraft are generally little stressing on this point, as compared to an attitude control system, and advantageously the bandwidth of the control of the energy of the actuator is in the range of 0.1 time and 1 time, the bandwidth of the attitude control system using the actuator 9.

In an actuator 9 according to the invention, the management of the energy is advantageously provided firstly using the motor-generator or motors-generators 5 and the management of the torques for controlling the orientation of the spacecraft is advantageously provided firstly using the coupling means 4.

Preferably, means inside or outside the actuator provide orders sent to the motors-generators 5 and to the coupling means 4 from high level set values, such as a set torque Cc and/or a total angular momentum set value Htc to be generated by the actuator 9 and/or a set total energy Etc to be accumulated in the actuator and from signals received from sensors inside the actuator.

Such sensors within the actuator are determined for calculating the total angular momentum Ht and the total energy Et of the actuator, for example the measurement of the rotation speeds $\omega 1$, $\omega 2$ of both momentum wheels 1, 2, for example using tachometers or measuring the rotation speed $\omega 1$ or $\omega 2$ of one of the momentum wheels and a characteristic value of the ratio R.

Advantageously, the actuator is provided with integrated control system which compensate the cross-effect of an "attitude control" or "energy" function with respect to the other, respectively "energy" or "attitude control" so that a high-level command produces only the expected effect on the spacecraft.

FIG. 3 illustrates in a block diagram an exemplary control system 100 for an actuator of a spacecraft 200 according to the invention.

For requirements in electric energy of the space craft 200, a set energy Etc on the actuator is obtained from a supply voltage Ub and a set voltage Uc for example through a power regulation and distribution system 102 of an electric supply of the spacecraft.

As for requirements in the orientation and the attitude control of the spacecraft 200, a set torque Cc or, in an equivalent way, a total angular momentum set value Htc to be supplied by the actuator is calculated by an attitude control calculator 103 from a vector of the set state Xc and a measured set vector Xm of the attitude of the spacecraft.

Calculation means 101 of the control system 100, from information on the state of the actuator, which means essentially measured rotation speeds $\omega 1$ and $\omega 2$ of both momentum wheels of the actuator or, in an equivalent way, speeds $\omega m1$ or $\omega m2$ and a reduction ratio of coupling means measured Rm, computed from a behavior template of the implemented actuator in the calculation means 101, on the one hand, set values $\omega c$ of rotation speed of a wheel, for example a set speed $\omega c1$ of the first wheel 1 and on the other hand a set value dRc/dt of the derivative with respect to the time of the reduction ratio R.

The value of the set speed $\omega c1$ is compared to a rotation speed $\omega m1$ measured by a measuring device 108 of the rotation speed $\omega 1$ of the wheel 1 for generating an error signal $\omega c1-\omega m1$ received by a device 104 controlling the rotation speed of the wheel, for example a device supplying a torque or current command allowing to obtain a set torque between the stator 51 and the rotor 52 of the motor 5.

Similarly, the set value dRc/dt is compared to a value dRm/dt of the derivative, with respect to the time of the measured reduction ratio Rm, measured by a measuring device 109, for generating a signal of error of derivative of the reduction ratio dRc/dt−dRm/dt.

In a close embodiment, the calculation means 101 calculate a set reduction ratio Rc which is used for controlling a measured value of the ratio Rm of the function of an error signal Rc−Rm.

Said error signal is received by a device 105 controlling the actuator coupling means 4.

The device 105 controlling the coupling means generates for example a torque command of a gear motor acting on the coupling means for modifying the ratio R or a tilt angle command on the roller 41 as in the case of a toroidal variable rotation speed drive or else on the speed of variation of the tilt angle of the roller 41.

Due to the dynamic response 111 of the spacecraft when the actuator is operated, the attitude state vector of the state of the attitude of the spacecraft is modified. The measure Xm of the attitude state vector is supplied by a device 112 measuring the attitudes of the spacecraft.

The internal measuring means and control systems integrated in the actuator according to the invention make it possible to advantageously use said actuator similarly to a conventional reaction wheel as far as the attitude control of a spacecraft is concerned, which means that the set torque sent to the control of said actuator according to the invention is the same as the one sent to a reaction wheel, with the difference that the operation range of said actuator according to the invention goes well beyond that of the conventional reaction wheel, as far as the obtainable torque is concerned.

More particularly, the control and the management of the cluster of actuators according to the invention can be carried out according to the same principles as for a conventional cluster of reaction wheels according to the state of the art of the space field, not only for obtaining the fine pointing of the satellite but also for obtaining quick tilting thereof, or to manage the off-loading of the cluster of actuators.

In an exemplary embodiment of an actuator 9 according to the invention, adapted to the attitude control of a satellite of approximately 1,000 kg, inertial wheels of 4 to 8 kg for a diameter of 500 to 350 mm, which means in practice an angular momentum of 50 to 120 Nms are driven by a motor supplying 20 to 50 W in a permanent speed and supplies a torque C of the control of attitude which can reach 50 Nm.

Advantageously, a spacecraft is provided with at least three actuators 9a, 9b, and 9c according to the invention, as shown in FIG. 3, the axes 61 of which are oriented in independent directions in the reference system of the spacecraft so as to enable the orientation of said spacecraft in every direction.

Other actuators 9 are, if need be, so arranged as to provide redundancies in the case of a failure of an actuator with the directions of said other actuators being determined so that each cluster of 3 actuators allows to orient the spacecraft in every direction.

The actuator according to the invention thus allows to provide an actuator, which in the function of the actuator, directly acts on the control axes without any significant consumption of energy, thus combining the advantages of the reaction wheels for the direction of controlled axes, and gyroscopic actuators for the consumption of energy, and which further provides the function of an accumulator of a kinetic energy without any interfering effect on the attitude of the spacecraft.

The invention claimed is:

1. An attitude control actuator, to be fixed in a spacecraft with respect to a reference system linked to the spacecraft, the actuator comprising:
a first momentum wheel;
at least one motor arranged to drive in rotation said first momentum wheel about an axis of rotation of said first momentum wheel; and
a second momentum wheel arranged to rotate about an axis parallel to or coinciding with the axis of rotation of the first momentum wheel,
wherein the second momentum wheel is mechanically coupled with the first momentum wheel through a mechanical coupling means comprising a variable rotation speed drive, said mechanical coupling means imposing a negative ratio (R), of a rotation speed of the second momentum wheel to a rotation speed of the first momentum wheel, resulting in contra-rotating first and second momentum wheels, said ratio (R) being continuously modifiable between a minimum value and a maximum value by transferring kinetic energy from one wheel to the other wheel when the first and second momentum wheels are rotating by the coupling means in response to a command.

2. An actuator according to claim 1, wherein the first momentum wheel and the second momentum wheel have the same inertia, and wherein the minimum value of the ratio (R) is less than −1 and the maximum value of the ratio (R) is more than −1.

3. An actuator according to claim 2, wherein the ratio (R) of the coupling means is in the range of −3 and −⅓.

4. An actuator according to claim 1, wherein the variable rotation speed drive is a toroidal variable rotation speed drive.

5. An actuator according to claim 4, wherein the toroidal variable rotation speed drive includes at least one roller linked to a fixed structure of said actuator, resting on rolling surfaces of the momentum wheels, said rolling surfaces of each momentum wheel being arcuately shaped and determined by the surface of a circular toroid having the same axis as the axis of rotation of the momentum wheels and having a circular cross section.

6. An actuator according to claim 5, wherein an angle of tilt δ of the at least one roller determining the ratio (R) of the toroidal variable rotation speed drive is controlled by a gear motor.

7. An actuator according to claim 1, wherein a measuring device delivers at least a signal consistent with the rotation speed of at least one of the first or second momentum wheels.

8. An actuator according to claim 7, wherein the measuring device includes at least one tachometer for measuring the rotation speed of one of the momentum wheels.

9. An actuator according to claim 1, further comprising a measuring device for delivering at least one signal consistent with the ratio (R) or a derivative (dR/dt) with respect to the time of said ratio (R), of the coupling means.

10. An actuator according to claim 9, wherein at least one angular sensor provides a measure of the angle of tilt (δ) of the at least one roller when the coupling includes a toroidal variable rotation speed drive provided with a roller for controlling the ratio (R).

11. An actuator according to claim 1, wherein the first and second momentum wheels driving motor receives a torque command or a current command.

12. An actuator according to claim 11, wherein a bandwidth of the torque command or the current command is in the range of ten percent of to one hundred percent of a bandwidth of an attitude control system of the spacecraft on which said actuator is to be fixed.

13. An actuator according to claim 1, wherein a gear motor acts on said coupling for modifying the ratio (R) or an angle of tilt (δ) of a roller of a toroidal variable rotation speed drive or a variation speed of an angle of tilt (δ) of a roller of a toroidal variable rotation speed drive.

14. An actuator according to claim 13, wherein the torque command or the current command controlling the gear motor acting on the coupling for modifying the ratio (R) or an angle of tilt (δ) has a bandwidth equal to at least twice a bandwidth of an attitude control system of a spacecraft on which said actuator is to be fixed.

15. An actuator according to claim 14, wherein the bandwidth of the torque command or the current command controlling the gear motor is in the range of five times and twenty times a bandwidth of the attitude control system of the spacecraft on which said actuator is to be fixed.

16. An actuator according to claim 1, wherein set values for a rotation speed ($\omega 1c$) for at least one of the wheels and a ratio derivative to the time (dR/dt) is calculated from set values of a torque (Cc) or a total angular momentum (Htc) and/or a total energy (Etc).

17. An actuator according to claim 16, wherein a total kinetic energy (Et) of both first and second momentum wheels is controlled with the total energy (Etc) set value from a measure of the rotation speeds ($\omega 1$, $\omega 2$) of said first and second momentum wheels and of said set total energy (Etc) using a torque or current command sent to the motor.

18. An actuator according to claim 16, wherein a torque output (C) of the actuator is controlled with a set torque (Cc) from the measurement of rotation speeds ($\omega 1$, $\omega 2$) of respectively first and second momentum wheels and said set torque (Cc) using a command (Rc) or (dRc/dt) sent to coupling actuators acting on the ratio (R).

19. An actuator according to claim 16, wherein a total angular momentum (Ht) of both first and second momentum wheels is controlled with a set total angular momentum (Htc) from a measurement of the rotation speed ($\omega 1$, $\omega 2$), of said first and second momentum wheels and said set total angular momentum (Htc) using a command (Rc) sent to coupling actuators acting on the ratio (R).

20. An actuator according to claim 16, wherein at least one of the first and second momentum wheels is coupled to a generator capable of generating energy through the braking of the momentum wheels.

21. An actuator according to claim 20, wherein the motor implemented for driving in rotation the first and second momentum wheels is operated as a generator for braking said momentum wheels.

22. An attitude control system of a spacecraft including at least one actuator according to claim 1 for generating torques along the axis of the first and second momentum wheels of said actuator.

23. An attitude control system of a spacecraft according to claim 22, wherein the at least one actuator is implemented for storing or supplying electric energy from the energy stored in a kinetic form in the first and second momentum wheels.

24. An attitude control system of a spacecraft according to claim 23 including a system for regulating and distributing power from an electric supply managing the transfer of energy between aboard energy sources and the actuator on the one hand and between energy consumers and the actuator on the other hand.

25. An attitude control system of a spacecraft according to claim 23 wherein at least three actuators are fixedly arranged in a reference system of the spacecraft so that directions defined by the axes of rotation of the first and second momentum wheels of each of said at least three actuators correspond to independent attitude control directions of the spacecraft.

* * * * *

UNITED STATES PATENT AND TRADEMARK OFFICE
CERTIFICATE OF CORRECTION

PATENT NO. : 9,180,983 B2  
APPLICATION NO. : 12/744174  
DATED : November 10, 2015  
INVENTOR(S) : Sperandei Page 1 of 1

It is certified that error appears in the above-identified patent and that said Letters Patent is hereby corrected as shown below:

On the title page item [30], "GB.........07 59224" should read -- FR..........07 59224 --

Signed and Sealed this  
First Day of March, 2016

Michelle K. Lee  
*Director of the United States Patent and Trademark Office*